United States Patent
Poiret

(10) Patent No.: US 6,656,071 B1
(45) Date of Patent: Dec. 2, 2003

(54) CHAIN OR BELT TENSIONER

(75) Inventor: Christian Poiret, Coulogne (FR)

(73) Assignee: Renold PLC (GB)

( * ) Notice: Subject to any disclaimer, the term of this patent is extended or adjusted under 35 U.S.C. 154(b) by 0 days.

(21) Appl. No.: 09/467,677

(22) Filed: Dec. 21, 1999

(30) Foreign Application Priority Data

Dec. 23, 1998 (GB) .............................. 9828304

(51) Int. Cl.$^7$ ................................ F16H 7/22
(52) U.S. Cl. ...................... 474/109; 474/115
(58) Field of Search ................ 474/101, 109, 474/110, 113, 115, 117, 133–138

(56) References Cited

U.S. PATENT DOCUMENTS

| | | | |
|---|---|---|---|
| 3,413,866 A | 12/1968 | Ford ................ | 74/242.11 |
| 4,773,892 A | 9/1988 | Zarifé et al. ............ | 474/138 |
| 4,962,834 A | * 10/1990 | Miner ................ | 188/321.11 |
| 4,973,290 A | 11/1990 | Hans et al. ............ | 474/117 |
| 4,997,411 A | 3/1991 | Breon et al. ............ | 474/110 |
| 5,021,032 A | * 6/1991 | Macchiarulo et al. ........ | 474/138 |
| 5,370,584 A | 12/1994 | Todd ................ | 474/110 |
| 5,601,505 A | 2/1997 | Tada ................ | 474/110 |
| 5,700,215 A | 12/1997 | Tada ................ | 474/110 |
| 5,700,216 A | 12/1997 | Simpson et al. .......... | 474/110 |
| 5,842,943 A | 12/1998 | Tada ................ | 474/109 |
| 5,860,881 A | 1/1999 | Tada ................ | 474/110 |
| 5,879,256 A | 3/1999 | Tada ................ | 474/110 |
| 6,036,612 A | * 3/2000 | Katogi et al. ............ | 474/110 |

FOREIGN PATENT DOCUMENTS

| | | |
|---|---|---|
| EP | 0 387 539 A2 | 2/1990 |
| EP | 0 779 452 A2 | 11/1996 |

* cited by examiner

Primary Examiner—Thomas R. Hannon
Assistant Examiner—Vicky A. Johnson
(74) Attorney, Agent, or Firm—Akin Gump Strauss Hauer & Feld, LLP

(57) ABSTRACT

A belt or chain tensioner comprises a plunger that is slidably received in a chamber of the tensioner housing. The plunger is biased by a spring to project out of the housing and into contact with a tensioning shoe by which tension is applied to the chain or belt. The chamber is supplied with hydraulic fluid to damp movement of the plunger within the housing. The spring is captively connected between the plunger and housing and located outside of the housing. The tensioner is simple to install and remove from an internal combustion engine as the plunger and housing are held together by the spring.

10 Claims, 1 Drawing Sheet

CHAIN OR BELT TENSIONER

CROSS-REFERENCE TO RELATED APPLICATION

Priority is claimed to British Patent Application No. 9828304.7, filed Dec. 23, 1998.

BACKGROUND OF THE INVENTION

The present invention relates to a chain or belt tensioner and more particularly, but not exclusively, to a tensioner of the kind for maintaining tension in a power transmission chain or belt of an internal combustion engine, In an internal combustion engine endless loop chains are often used to transmit driving power from the crankshaft to the camshaft and/or to auxiliary devices such as water or oil pumps, air conditioning devices etc. The chain travels between a plurality of sprockets each of which is connected to a driving or driven device. Tie tension of a chain can vary as a result of chain and sprocket wear or temperature variations. It is important to ensure that the chain is maintained in a sufficiently tensioned state to prevent noise or slippage of the chain relative to a sprocket.

Known chain tensioners comprise a reciprocal plunger that is biased out of a housing into contact with a tensioning shoe that bears against the chain to impart tension thereto. The biasing force is provided by a combination of a coil spring mounted inside a chamber in the plunger and hydraulic fluid that flows into the chamber from an external source. The hydraulic fluid also serves to damp movement of the plunger in the housing.

Assembly or dismantling of a chain tensioner of this kind to or from the engine can be difficult as a result of the spring force acting between the housing and the plunger. In some designs the components are not held together and the plunger may fall into the engine during initial assembly or installation during servicing of the tensioner. This has led to a separate device being incorporated to hold all the components together. This obviously adds to manufacturing and assembly costs.

In applications where a small tensioning load and therefore a small plunger is required it is not possible to use a conventional coil spring inside a chamber of the plunger and obtain sufficient biasing force.

It is known to mount the biasing coil spring on the outside of plunger and/or housing. Examples are shown in EP-A-0387539 and U.S. Pat. No. 4,973,290 but neither of these designs allows for easy installation or removal from the internal combustion engine.

U.S. Pat. No. 5,700,215 discloses a hydraulic tensioner for a belt or chain that comprises a plunger slidable within a support part that is screwed into a housing. The support part has a spigot that projects from the housing. A coil spring is disposed on the outer surface of the spigot and bears against an end face of the support part and the plunger so as to bias the plunger out of the housing. A stopper screw is provided in the housing and is engageable with part of the plunger to hold the latter in a retracted position during installation or maintenance.

U.S. Pat. No. 4,997,411 described a slack adjuster for a timing belt or chain. The structure of the adjuster is relatively complex with many components. A dynamic plunger is coxially aligned with and slidable relative to a stationary plunger both plungers being received in a sleeve. The dynamic and static plungers are linked by a coil spring that biases the dynamic plunger away from the static plunger and towards the chain to eliminate slack. There is a relatively complex arrangement of check valves for preventing fluid from flowing back into a main chamber in the static plunger when the chain is tensioned and to allow a small amount of fluid and all entrapped air to exit via a passageway. The ends of the coil spring bear against respective flanges, one connected to the dynamic plunger and one with spaced projections connected to the static plunger. The arrangement is not compact and suffers from friction losses ill view of the many components.

SUMMARY OF THE INVENTION

According to the present invention there is provided a belt or chain tensioner comprising a housing having a chamber, a plunger slidably displaceable within the chamber and a spring disposed around the outside of the housing and plunger so as to bias the plunger to a position protruding from the housing, the spring being captively connected to the housing by means of at least one coil of the spring being located over a lip on an exterior surface of the housing and captively connected to said plunger, the plunger having an enlarged head that projects from the housing and against which the spring bears.

The chain tensioner can thus be installed into or removed from an internal combustion engine in one piece without the plunger and housing separating under the influence of the spring.

Preferably the coil is received in groove immediately adjacent the lip of housing.

There may be a tapered surface adjacent the head, a coil of the second end of the spring being retained between the head and the tapered surface.

The plunger is preferably solid.

BRIEF DESCRIPTION OF THE DRAWINGS

A specific embodiment of the present invention will now be described, by way of example only, with reference to the accompanying drawings in which.

DETAILED DESCRIPTION OF THE INVENTION

Figure 1:
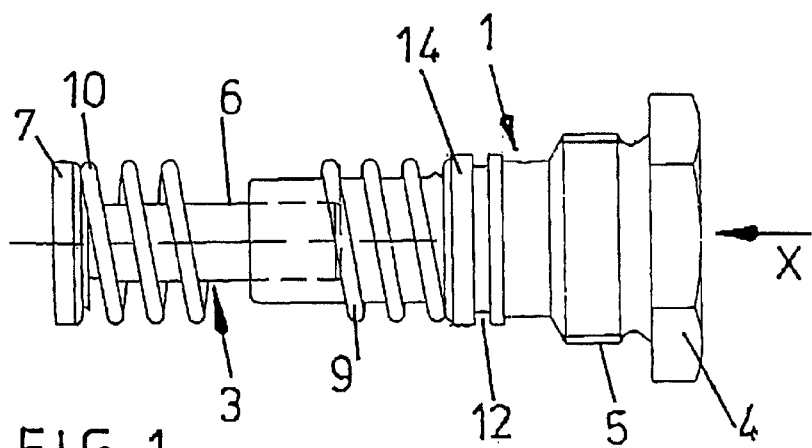
FIG. 1 is a side view of a chain tensioner in accordance with the present invention.
Figure 2:
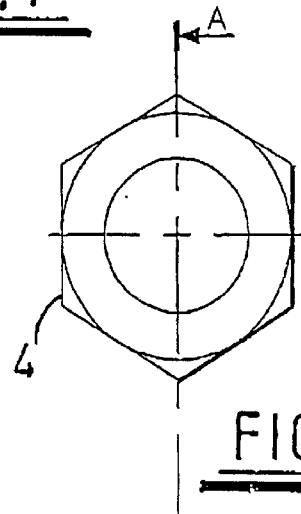
FIG. 2 is an end view of the tensioner of FIG. 1 in the direction of arrow X.
Figure 3:
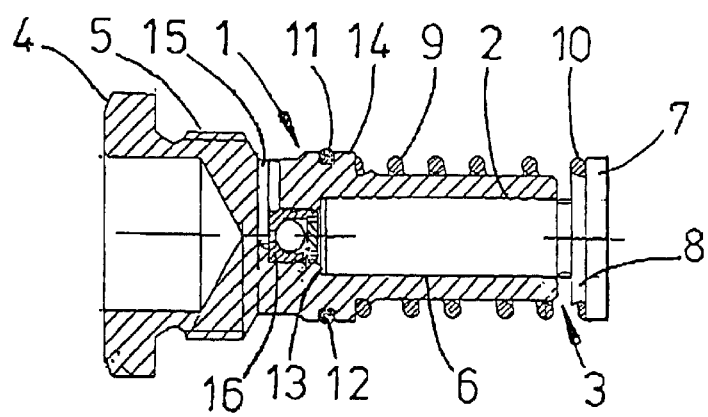
FIG. 3 is a longitudinal sectional view of the chain tensioner along line AA of FIG. 2.

Referring now to the drawings, the chain tensioner comprises a generally cylindrical housing 1 having at one end a blind bore defining a chamber 2 in which a plunger 3 is received. The plunger 3 is slidably displaceable in a longitudinal direction within the chamber 2 and protrudes from the housing 1 to bear against a tensioning shoe (not shown) associated with a chain or belt (not shown) of an internal combustion engine (not shown).

The tensioner is designed to locate in an aperture in the casing of the internal combustion engine and has a hexagonal head 4 and threaded section 5 by which it may be inserted or removed.

The plunger 3 comprises a cylindrical shank 6 and with an enlarged head 7 at one end. Immediately adjacent the head 7 the plunger 3 has a tapered annular step 8.

The plunger 3 is retained in the chamber 2 by means of a coiled compression spring 9 an end coil 10 of which is captively retained on the tapered step 8 of the plunger 3 and the other end coil 11 of which is captively retained in an annular groove 12 defined on the exterior surface of the housing 1 radially outwards of the base 13 of the chamber 2. In FIG. 1 the end coil 11 of the spring 9 is not shown so as to expose the annular groove 12. A lip 14 separates the groove 12 from the portion of the housing 1 that defines the chamber 2.

In use the spring serves to bias the plunger 3 out of the housing chamber 2 and into contact with the tensioning shoe.

The chamber 2 is supplied with hydraulic damping fluid from a source (not shown) such as a reservoir or pump. The fluid enters the chamber 2 via a radial passage 15 in the housing 1 near the base 13 of the chamber 2 and is fed to the chamber 2 via a non-return ball valve 16 as is well known.

The tensioner described is particularly suitable for low load applications in which the surface area of the plunger head is relatively small in order to limit the force applied to the tensioning shoe. The small diameter of the plunger head provides a reduced static force and thus reduces friction between the tensioner and shoe. In such cases the plunger is so small that it is not possible to use a conventional coil spring inside a bore in the plunger and obtain sufficient biasing force. In positioning the spring outside of the housing, as in the present invention, a spring having sufficient biasing force can be used. Moreover, with such a design the spring is captively secured on the plunger and housing so that the plunger is retained in the chamber. This makes installation, removal and replacement of the tensioner for servicing etc an easier task The design is extremely compact.

It will be appreciated that numerous modifications to the above described design may be made without departing from the scope of the invention as defined in the appended claims. For example, the same tensioner design may be used to tension an elongate flexible driving belt instead of a chain.

What is claimed is:

1. A belt or chain tensioner comprising:

a housing having a chamber, a plunger slideably displaceable within the chamber, said plunger having a main portion for receipt in said chamber, an enlarged head adapted to bear against a tensioning shoe, and a tapered surface adjacent to and integral with said head between said head and said main portion, the tapered surface being separated from said main portion by an inwardly directed step, and a spring disposed around the outside of the housing and plunger so as to bias the plunger to a position protruding from the housing, the spring being captively connected to the housing by means of at least one coil of the spring being located over a lip on an exterior surface of the housing and captively connected to said plunger by means of at least one coil of an end of the spring being disposed on said tapered surface and bearing against said head.

2. The belt or chain tensioner according to claim 1, wherein the coil is received in a groove immediately adjacent the lip of housing.

3. The belt or chain tensioner according to claim 1 or 2, wherein the plunger is solid.

4. The belt or chain tensioner of claim 1, wherein a circumferential groove is defined adjacent to the lip on the housing, the lip defining one side of the groove, and wherein an end coil of the spring is received in the groove for connecting the spring to the housing.

5. A belt or chain tensioner, comprising:

a housing having the general shape of a bolt having a shank with first and second ends, the shank having a chamber open to the first end, the housing having a raised lip about its circumference;

a plunger movably received in the chamber of the housing, the plunger having an enlarged head and an adjacent tapered surface integral with the enlarged head; and a coil spring surrounding the plunger and the housing, the coil spring having a first end engaged with the lip on the housing and a second end connected to the plunger, wherein the spring retains the plunger within the chamber, as a result of the second end of the coil spring being supported on the surface the second end being retained between the surface and the enlarged head of the plunger.

6. The belt or chain tensioner of claim 5, wherein the chamber in the housing has a base, and where the spring holds the plunger outwardly from the base.

7. The belt or chain tensioner of claim 5, wherein a fluid cavity is defined within the chamber of the housing between the base of the chamber and an end of the plunger.

8. The belt or chain tensioner of claim 7, wherein the housing has a passageway adapted for passing hydraulic damping fluid to the fluid cavity.

9. The belt or chain tensioner of claim 5, wherein the housing has a head on the end opposite the opening for the chamber.

10. The belt or chain tensioner of claim 5, wherein the plunger head is adapted to bear against a tensioning shoe.

\* \* \* \* \*